(12) United States Patent
Katoh et al.

(10) Patent No.: US 6,264,378 B1
(45) Date of Patent: Jul. 24, 2001

(54) CAMERA HAVING SLIDE COVER

(75) Inventors: Minoru Katoh, Utsunomiya; Hidenori Miyamoto, Urayasu; Tomoki Nishimura, Kawasaki, all of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/415,458

(22) Filed: Oct. 14, 1999

(30) Foreign Application Priority Data

Oct. 14, 1998 (JP) .................................................. 10-291983

(51) Int. Cl.[7] .................................................. G03B 17/04

(52) U.S. Cl. .......................................... 396/348; 396/448

(58) Field of Search .................................. 396/348, 349, 396/448, 176, 28, 29

(56) References Cited

U.S. PATENT DOCUMENTS

| | | | |
|---|---|---|---|
| 4,557,574 | * | 12/1985 | Kohno et al. .......................... 396/448 |
| 4,589,747 | * | 5/1986 | Nakayama et al. .................... 396/448 |
| 4,601,562 | * | 7/1986 | Yoneyama et al. .................... 396/448 |

FOREIGN PATENT DOCUMENTS 60-128337 U    8/1985  (JP) .

* cited by examiner

*Primary Examiner*—David M. Gray
(74) *Attorney, Agent, or Firm*—Oliff & Berridge, PLC

(57) ABSTRACT

A camera includes: a camera main body having a lens barrel; and a slide cover that moves relative to the camera main body between a camera non-use position at which the lens barrel, at least, is covered and a camera use position at which the lens barrel is exposed. And a sealed space is formed at the slide cover and a camera component is provided in the sealed space.

16 Claims, 11 Drawing Sheets

FIG. 3
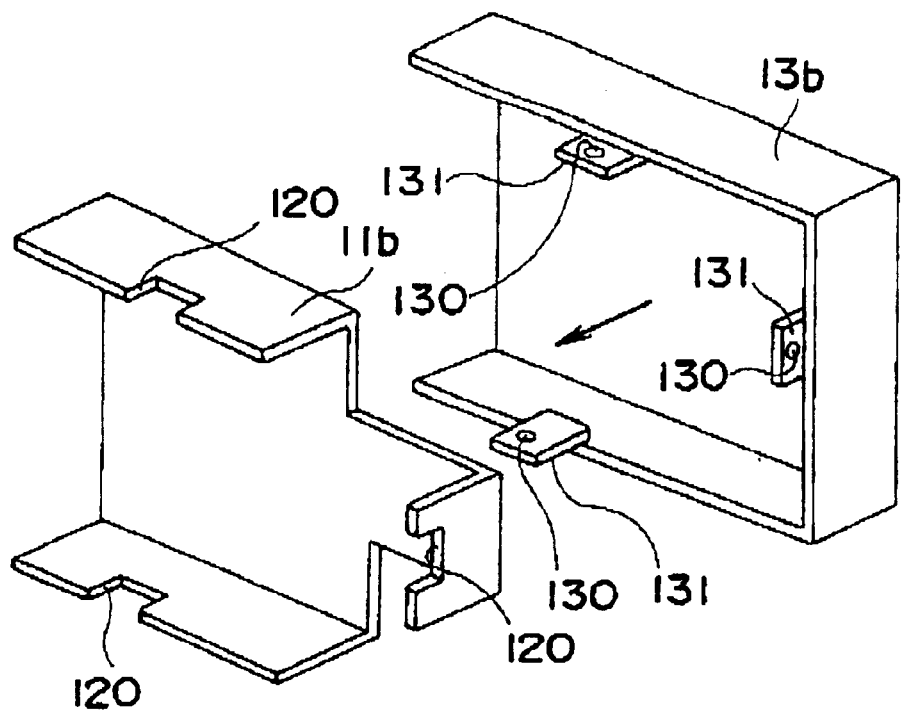
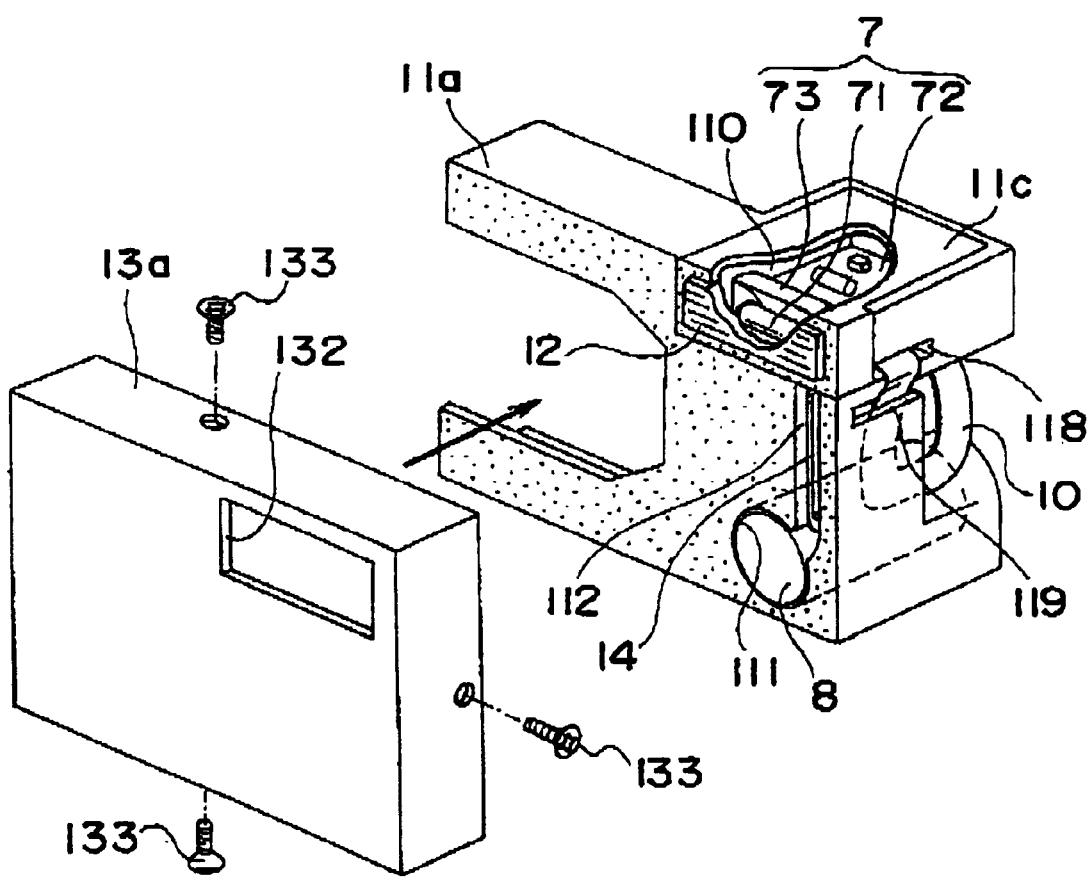

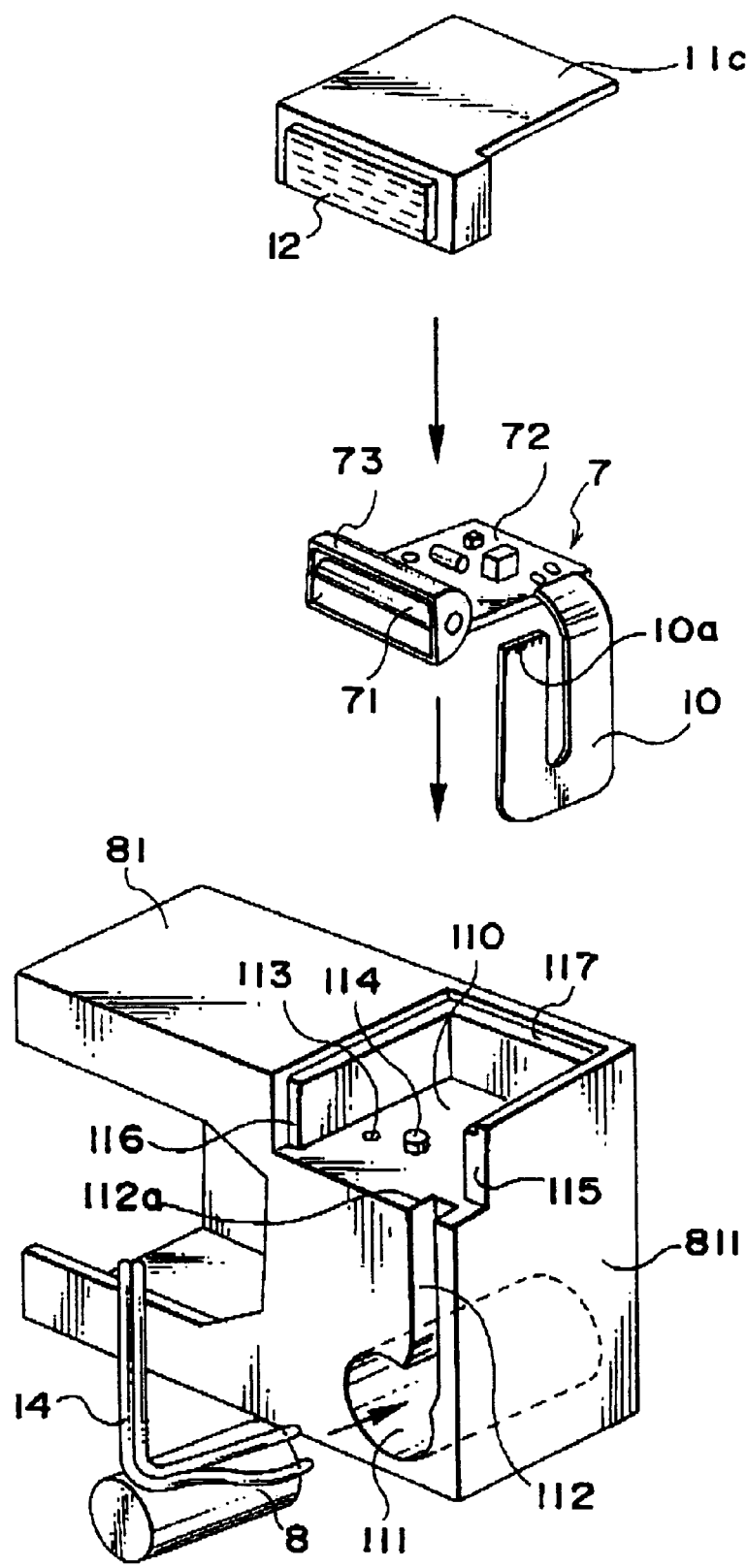

US 6,264,378 B1

CAMERA HAVING SLIDE COVER

INCORPORATION BY REFERENCE

The disclosure of the following priority application is herein incorporated by reference:

Japanese Patent Application No. 10-291983 filed Oct. 14, 1998

BACKGROUND OF THE INVENTION

1. Field of the Invention

The present invention relates to a camera with a camera component such as an electronic flash device at a slide cover covering a portion of the camera main body unit.

2. Description of the Related Art

In a camera having a slide cover that protects a photographing lens and the like, the photographing lens is exposed by opening the slide cover during a photographing operation while the photographing lens is protected from external forces and the like by closing the slide cover in a non-photographing state. Cameras provided with such a slide cover in the known art include those in which the light emitting portion of an electronic flash device, electrical components and the like mounted at the inside of the slide cover as disclosed in Japanese Laid Open Utility Model Publication No. 60-128337.

However, in such a camera in the known art described above, there is a problem in that since the light emitting portion or the electrical components are directly mounted on the inside of the slide cover, the light emitting portion, the electrical components and the like tend to become damaged readily by drops of water and the like entering through the gap between the camera main body unit and the slide cover.

SUMMARY OF THE INVENTION

An object of the present invention is to provide a camera mounted with camera components such as an electronic flash device at a slide cover, which achieves outstanding drip-proofing and water-proofing for the camera components.

In order to achieve the object described above, the present invention is adopted in a camera comprising: a camera main body having a lens barrel; and a slide cover that moves relative to the camera main body between a camera non-use position at which the lens barrel, at least, is covered and a camera use position at which the lens barrel is exposed. And a sealed space is formed at the slide cover and a camera component is provided in the sealed space.

In this camera, preferably, the slide cover is formed in a sheath shape to house the camera main body when the camera is in a non-use state.

Also, preferably, the space is sealed to achieve, at least, drip-proofing and the camera component is an electrical component.

Also, preferably, the slide cover comprises an inner cover at which a housing space for housing the camera component is formed and an outer cover that covers an outer side of the inner cover, and the housing space is sealed by covering the outer side of the inner cover with the outer cover. In addition, preferably, the camera component is an electronic flash device for illuminating a subject, and the inner cover is constituted of an insulating material. Furthermore, preferably, the inner cover is formed in a roughly carton shape having a bottom to house the camera main body; a communicating hole which communicates between a carton-shaped inner space of the carton-shaped inner cover and the housing space where the electronic flash device for illuminating the subject is housed is provided at the inner cover; and a wiring member that connects the electronic flash device inside the housing space to an electronic flash device control circuit inside the camera main body is led out to the carton-shaped inner space from the housing space via the communicating hole to be placed in a gap between the camera main body and a bottom portion of the inner cover.

Another camera according to the present invention comprises: a camera main body having a lens barrel; and a slide cover that moves relative to the camera main body between a camera non-use position at which the lens barrel, at least, is covered and a camera use position at which the lens barrel is exposed. And the slide cover comprises an inner cover having at least two housing spaces for housing camera components and an outer cover that covers an outer side of the inner cover; the two housing spaces are sealed and a linking space that links the two housing spaces with each other is formed between the inner cover and the outer cover, by covering the outer side of the inner cover with the outer cover; and a linking member that links the camera components housed in the two housing spaces with each other is provided in the linking space.

In this camera, preferably, a light emitting portion of an electronic flash device for illuminating a subject is housed in one of the two housing spaces; an electrical component that is part of the electronic flash device for illuminating the subject is housed in the other housing space; and an electrical connecting member that electrically connects the light emitting portion and the electrical component is provided in the linking space.

Another camera according to the present invention comprises: a camera main body having a lens barrel; and a slide cover that moves relative to the camera main body between a camera non-use position at which the lens barrel, at least, is covered and a camera use position at which the lens barrel is exposed. And the slide cover comprises an inner cover having a housing space for housing a camera component and an outer cover that covers an outer side of the inner cover; the housing space is sealed by covering the outer side of the inner cover with the outer cover; and a hole through which a linking member that links the camera component housed in the housing space and another camera component outside the housing space is led out from the sealed housing space is formed at the inner cover.

In this camera, preferably, the camera component housed in the housing space is a light emitting portion of an electronic flash device for illuminating a subject; and the other camera component is an electrical circuit portion of the electronic flash device for illuminating a subject provided at the camera main body.

Also, preferably, the hole is filled with a filler material to seal the housing space in a state in which the linking member is led out.

BRIEF DESCRIPTION OF THE DRAWINGS

FIG. 3 illustrates the structure of the slide cover 1 in detail;

FIG. 7 illustrates the procedure through which the strobe unit 7 and the capacitor 8 are mounted at the inner cover 81;

DESCRIPTION OF THE PREFERRED EMBODIMENTS

The followign is an explanation of the preferred embodiments of the present invention, given in reference to FIGS. 1~11.

First Embodiment

Figure 1:
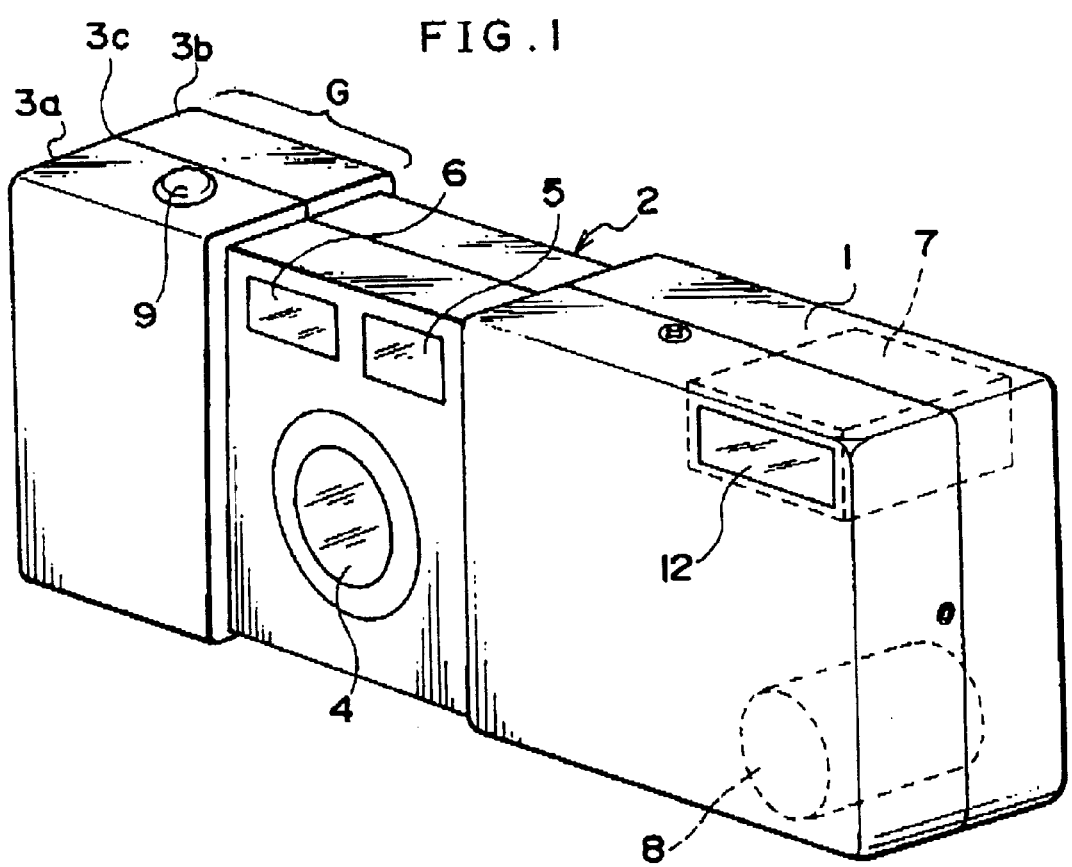
FIG. 1 is an external view of the camera in perspective, illustrating a state in which the slide cover 1 is open.
Figure 2:
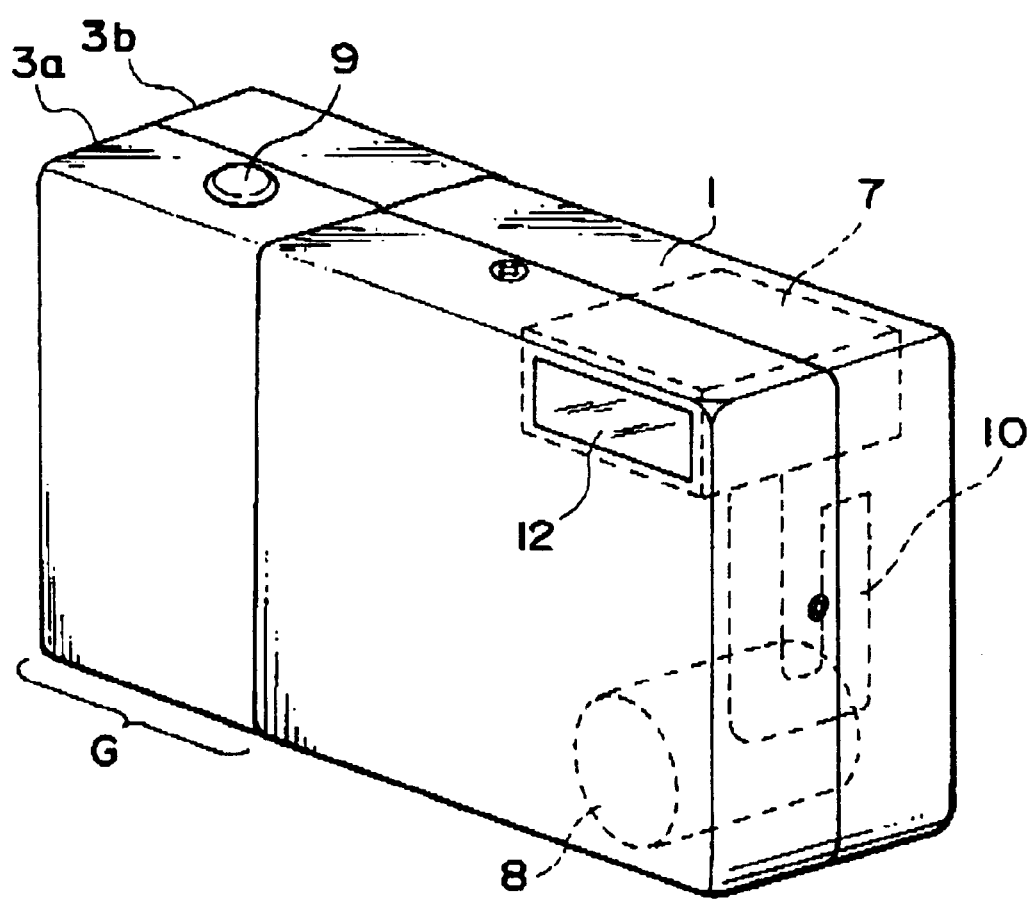
FIG. 2 is an external view of the camera in perspective, illustrating a state in which the slide cover 1 is closed.

FIGS. 1 and 2 present external views of the camera in the first embodiment of the present invention, with FIG. 1 illustrating the camera with a slide cover 1 open in perspective and FIG. 2 illustrating the camera with the slide cover 1 closed in perspective. The sheath-type (or capsule-type) slide cover 1 is a carton-shaped cover having a bottom whose cross section is rectangular, and a camera main body unit 2 is housed inside its inner hollow portion. Reference numbers 3a and 3b respectively indicate a main body front cover and a main body rear cover that cover the camera main body (not shown), and the camera main body is covered by fitting the main body front cover 3a and the main body rear cover 3b into each other. A filler material is placed to fill a fitting portion 3c where the main body front cover 3a and the main body rear cover 3b fit together to achieve a sealed state for the camera main body, thereby assuring drip-proofing for the camera main body unit 2.

A guide member (not shown) is provided between the slide cover 1 and the camera main body unit 2 to link the slide cover 1 and the camera main body unit 2 and to guide the slide cover 1. The slide cover 1 is capable of moving between an open position at which a photographing lens barrel 4, a viewfinder objective window 5 and an AF window 6 provided at the camera main body unit 2 are exposed, as illustrated in FIG. 1, and a closed position at which the portion of the camera main body unit 2 where the photographing lens barrel 4, the viewfinder objective window 5 and the AF window 6 are provided is covered by the slide cover 1 and housed inside the slide cover 1 (in the hollow portion) as illustrated in FIG. 2. As indicated by the dashed lines, a strobe unit 7 and a strobe capacitor 8 are secured on the inside of the slide cover 1 so that they travel with the slide cover 1.

When the slide cover 1 is closed as illustrated in FIG. 2, the slide cover 1 becomes integrated with a grip portion G of the camera main body unit 2 to become part of the camera external shape. Reference number 9 indicates a shutter release button provided at the grip portion G and reference number 10 indicates a flexible printed board (FPC) which connects the strobe unit 7 with a strobe control unit (not shown) housed inside the camera main body unit 2. In addition, reference number 12 indicates a diffusion plate provided at the front surface of a strobe light emitting portion 71 (see FIG. 3, which is to be described in detail later).

FIG. 3 illustrates the slide cover 1 in detail. The slide cover 1 assumes a dual structure provided with inner covers 11a, 11b and 11c constituted of an insulating material (e.g., molded plastic) and metal outer covers 13a and 13b that cover the outer side of the inner covers. As explained later, the strobe unit 7 is housed in the space formed by the inner cover 11a and the inner cover 11c. In addition, the capacitor 8 is housed in a hole portion 111 which has a bottom and is formed at the inner cover 11a, with a lead wire 14 connecting the capacitor 8 and the strobe unit 7 with each other drawn is housed inside a groove portion 112 formed at the inner cover 11a. The strobe unit 7 is provided with the strobe light emitting portion 71, a step-up circuit 72 and a reflector 73.

Figure 4:
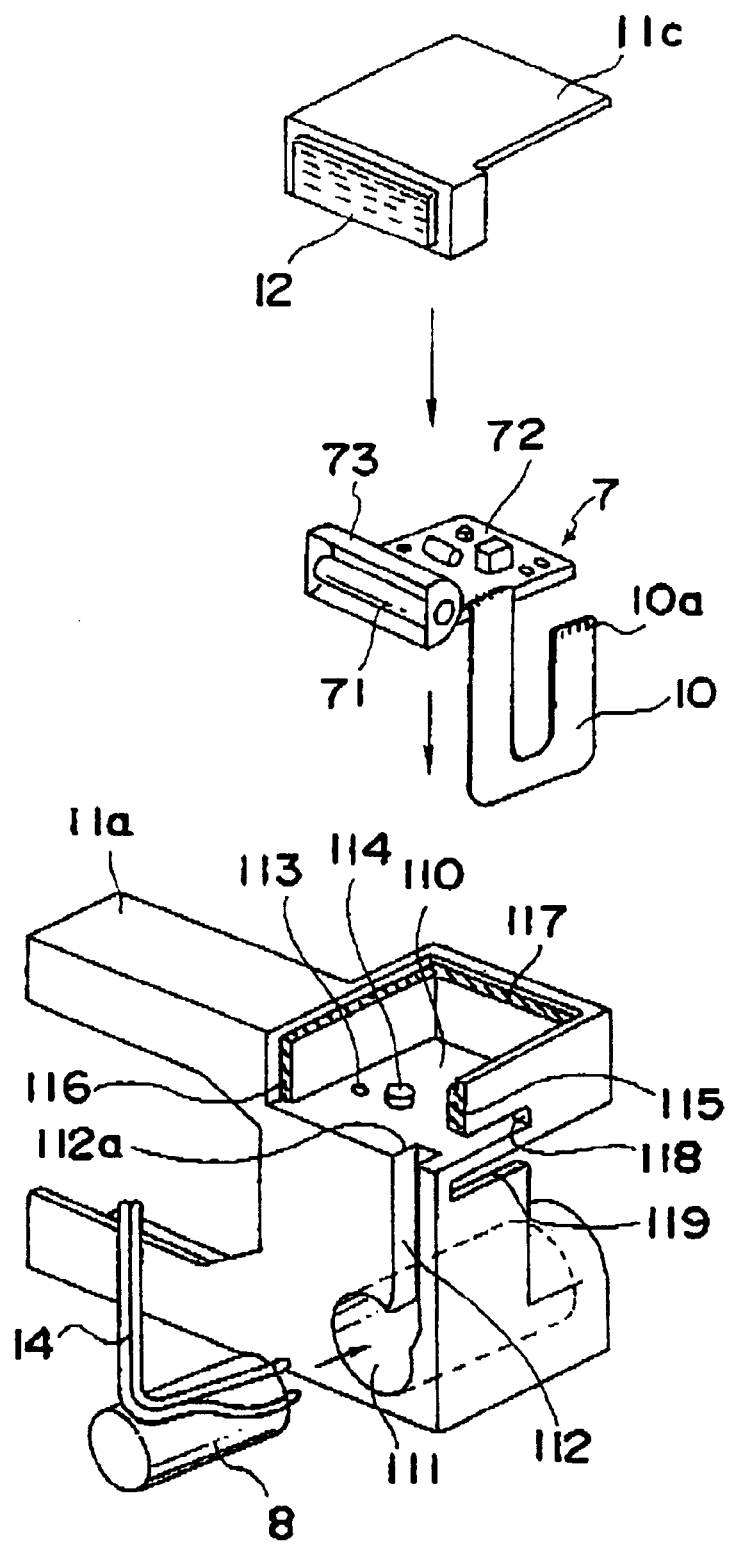
FIG. 4 illustrates the procedure through which the strobe unit 7 and the capacitor 8 are mounted.

FIG. 4 illustrates the procedure through which the strobe unit 7 and the capacitor 8 are mounted. The step-up circuit 72 and the capacitor 8 are connected with each other through the lead wire 14, with the strobe unit 7 housed inside a housing portion 110 formed at the inner cover 11a, the capacitor 8 housed inside the hole portion 111 and the lead wire 14 housed inside the groove portion 112. It is to be noted that a positioning pin (not shown) is provided at the lower surface of the strobe unit 7, and when the strobe unit 7 is placed inside the housing portion 110, the positioning pin is fitted inside a positioning hole 113 formed at the mounting surface of the inner cover 11a to position the strobe unit 7. Then, the strobe unit 7 is secured onto a retaining boss 114 with a screw (not shown).

Next, the inner cover 11c mounted with the diffusion plate 12 is bonded to surfaces 115, 116 and 117 (shaded surfaces) of the inner cover 11a. At this time, the FPC 10 connected to the strobe unit 7 is passed through notched portions 118 and 119 of the inner cover 11a as illustrated in FIG. 3, and a connecting portion 10a of the FPC 10 is connected to the strobe control unit (not shown) inside the camera main body unit 2 (see FIG. 1). In addition, the notched portion 118 is filled with filler material to block the gap between the FPC 10 and the notched portion 118. As a result, the housing portion 110 (the space formed by the inner cover 11a and the inner cover 11c) that houses the strobe unit 7 becomes sealed except for a portion 112a of the groove portion 112 through which the lead wire 14 passes. It is to be noted that when the inner cover 11c is secured to the inner cover 11a, the diffusion plate 12 provided at the inner cover 11c becomes placed at the front surface of the light emitting portion 71.

When the strobe unit 7 and the capacitor 8 are mounted at the inner cover 11a as described above, he outer cover 13a is bonded and secured to the inner cover 11a as illustrated in FIG. 3. Since the hatched surfaces of the inner covers 11a and 11c come in close contact with the inner surface of the outer cover 13a when the outer cover 13a is bonded to the inner cover 11a (an adhesive is applied to the hatched area), the housing portion 110, the hole portion 111 and the groove portion 112 become sealed. A rectangular hole 132 is formed at the outer cover 13a, and the diffusion plate 12 is exposed at the front surface of the outer cover 13a through the hole 132.

The outer cover 13b is bonded and secured to the inner cover 11b. It is to be noted that projecting portions 131 are provided at the outer cover 13b, each projecting portion 131 having a screw hole 130 for securing the outer cover 13a to the outer cover 13b, and the projecting portions 131 become fitted at notched portions 120 of the inner cover 11b when the outer cover 13b is secured to the inner cover 11b. Lastly, the outer cover 13a and the outer cover 13b are tightened together with a screw 133 to achieve an integrated unit, thereby achieving a completed slide cover 1.

Figure 5A:
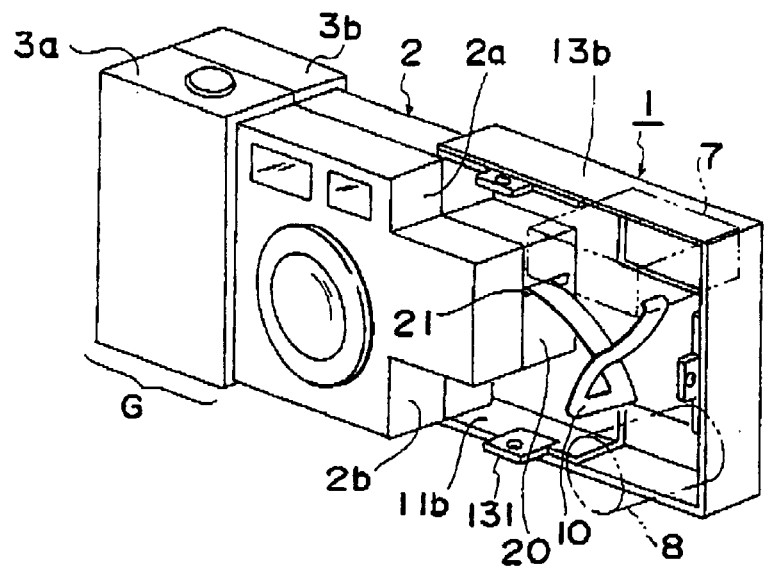
FIG. 5A is a perspective illustrating the relationship between the slide cover 1 and the camera main body unit 2 achieved when the slide cover 1 is open.
Figure 5B:
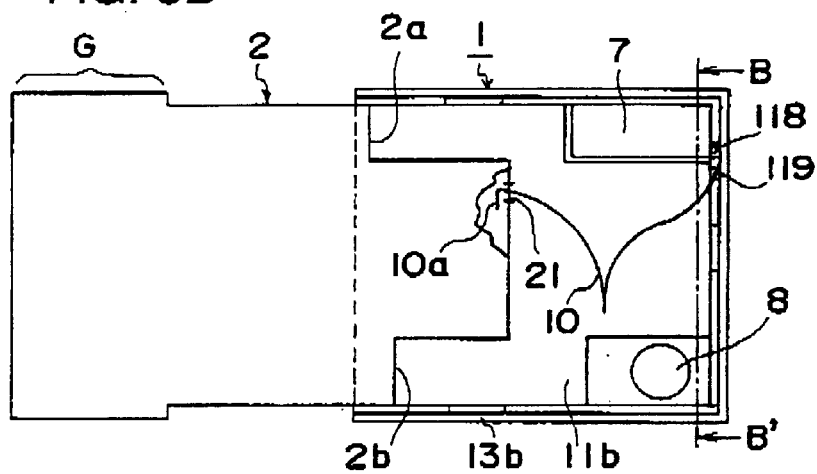
FIG. 5B is a frontal view illustrating the relationship between the slide cover 1 and the camera main body unit 2 achieved when the slide cover 1 is open.
Figure 5C:
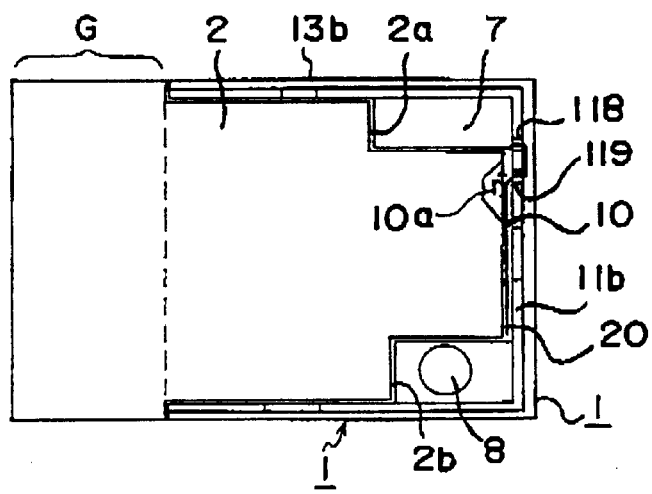
FIG. 5C is a frontal view illustrating the relationship between the slide cover 1 and the camera main body unit 2 achieved when the slide cover 1 is closed.

FIGS. 5A–5C illustrate the relationship between the slide cover 1 and the camera main body unit 2, with FIG. 5A presenting a perspective and FIG. 5B and 5C each presenting a frontal view. FIGS. 5A and 5B illustrate a state in which the slide cover 1 is open, whereas FIG. 5C illustrates a state in which the slide cover 1 is closed, with the outer cover 13a and the inner cover 11a (see FIG. 3) omitted in all the figures to clearly illustrate the inside of the slide cover 1. As illustrated in FIGS. 5A–5C, the portion of the camera main body unit 2 toward the slide cover 1 (the portion covered by the slide cover 1 at all times) is formed in a projecting shape, with a notched portion 21 through which the FPC 10 passes formed at its end surface 20. The FPC 10 is passed through the notched portion 21 and then is placed inside the camera main body unit 2 where it is connected to the strobe control unit housed inside the camera main body unit 2 via the connecting portion 10a. It is to be noted that the filler material is used to fill the gap between the notched portion 21 and the FPC 10 to maintain the inside of the camera main body unit 2 in a sealed state.

When the slide cover 1 is closed as illustrated in FIG. 5C, the strobe unit 7 and the capacitor 8 are positioned at clearance (spaces) 2a and 2b formed at the top and the bottom of the projecting portion of the camera main body unit 2. In addition, the FPC 10 is housed in the gap formed between the end surface 20 of the camera main body unit 2 and the inner covers 11a and 11b of the slide cover 1 in this state.

Figure 6:
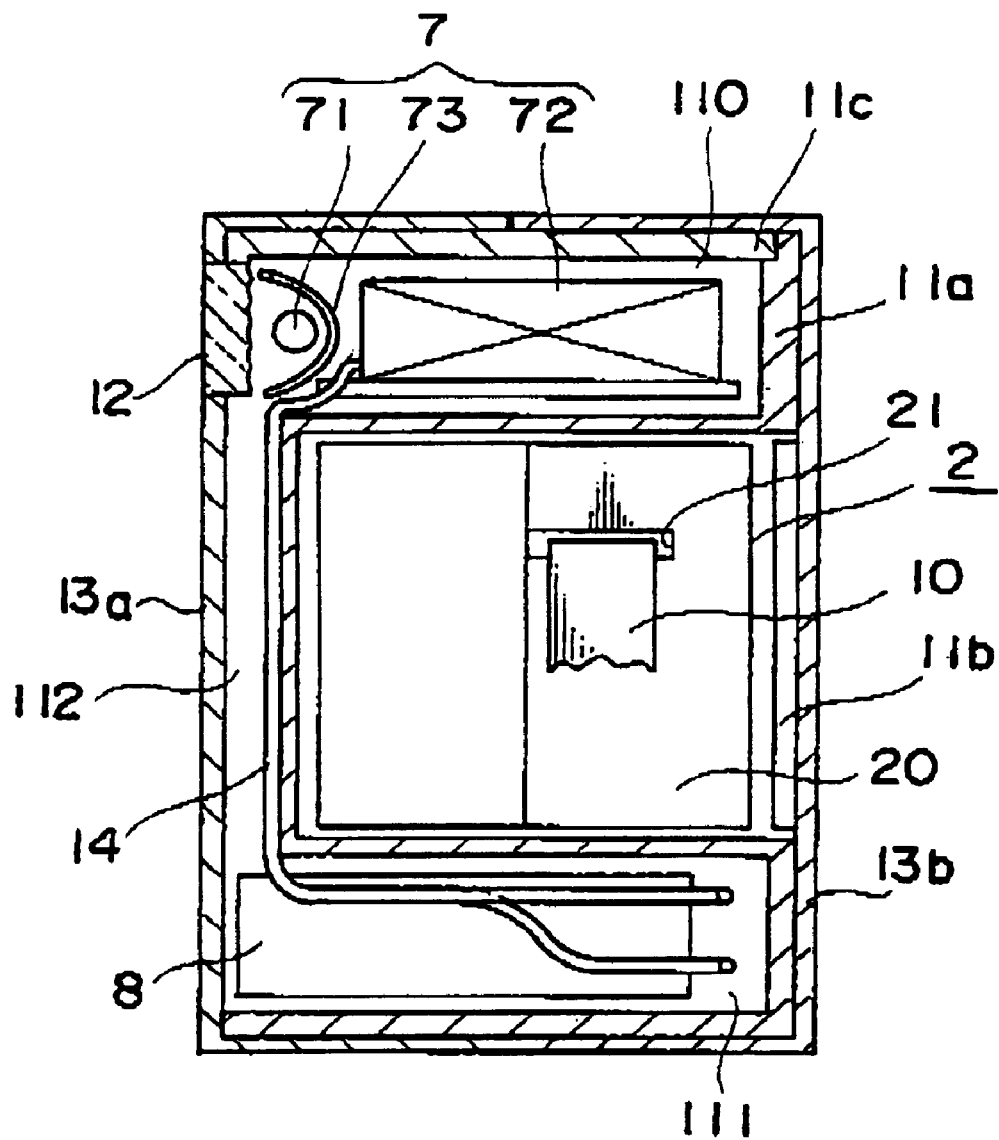
FIG. 6 is a cross section along B–B' line in FIG. 5B.

In FIG. 6, which presents a cross section along B–B' line in FIG. 5B, the inner cover 11a and the outer cover 13a are shown without omission. The strobe unit 7, the capacitor 8 and the lead wire 14 are housed in the sealed space formed by the housing portion 110, the groove portion 112 and the hole portion 111 at the inner cover 11a.

As explained above, in the camera in this embodiment, in which the strobe unit 7, the capacitor 8 and the lead wire 14 are housed in the airtight space formed between the inner covers 11a, 11b and 11c constituted of an insulating material and the outer covers 13a and 13b constituted of metal at the slide cover 1, an improvement is achieved in the drip-proofing and the water proofing for the camera components (the strobe unit 7, the capacitor 8, the lead wire 14) provided at the slide cover 1. In addition, by achieving a dual structure for the slide cover 1, comprising the inner covers 11a, 11b and 11c constituted of an insulating material and the outer covers 13a and 13b constituted of metal, an improvement is achieved in the ease of assembly and the strength of the slide cover 1. Furthermore, since the strobe unit 7, the capacitor 8 and the lead wire 14 are housed inside the inner cover 11a that achieves good insulation, these components can be insulated from the metal outer covers 13a and 13b. In other words, since the inner covers 11a, 11b and 11c achieve three functions, i.e., (1) drip-proofing and water-proofing for the strobe unit 7 and the like, (2) improving the strength of the slide cover 1 and (3) insulating the strobe unit 7 and the like from the metal outer covers 13a and 13b, the quality of the camera is improved without having to increase the production cost.

In addition to the advantages described above, since drip proofing is achieved individually at the camera main body unit 2 and the slide cover 1, it is not necessary to reduce the gap between the slide cover 1 and the camera main body unit 2 as would be necessary in a camera in the prior art in which drip proofing is not achieved at the slide cover. Thus, it is not necessary to implement rigorous production error control (sever assembly margin control) and, consequently, a reduction in production cost can be achieved. Furthermore, since a certain degree of gap can be tolerated, the load during the sliding operation can be reduced.

Second Embodiment

While the inner covers and the outer covers in the first embodiment are respectively integrated by fitting together the frontward cover and the rearward cover, an integrated inner cover and an integrated outer cover may be formed to allow the outer cover to be externally fitted at the inner cover. FIG. 7, which is similar to FIG. 4, illustrates the process for mounting the strobe unit 7 and the capacitor 8 at an inner cover 81 which is formed as an integrated component through plastic molding. The inner cover 81 is similar to the inner cover 11a in FIG. 4 in that it is provided with a housing portion 110, a hole portion 111, a groove portion 112 and the like similar to those of the inner cover 11a and they are assigned with the same reference numbers. The inner cover 81 differs from the inner cover 11a only in that it is formed in a carton shape with a bottom. In addition, the strobe unit 7 and the capacitor 8 are mounted at the inner cover 81 through a mounting procedure similar to that employed in the first embodiment.

Figure 8A:
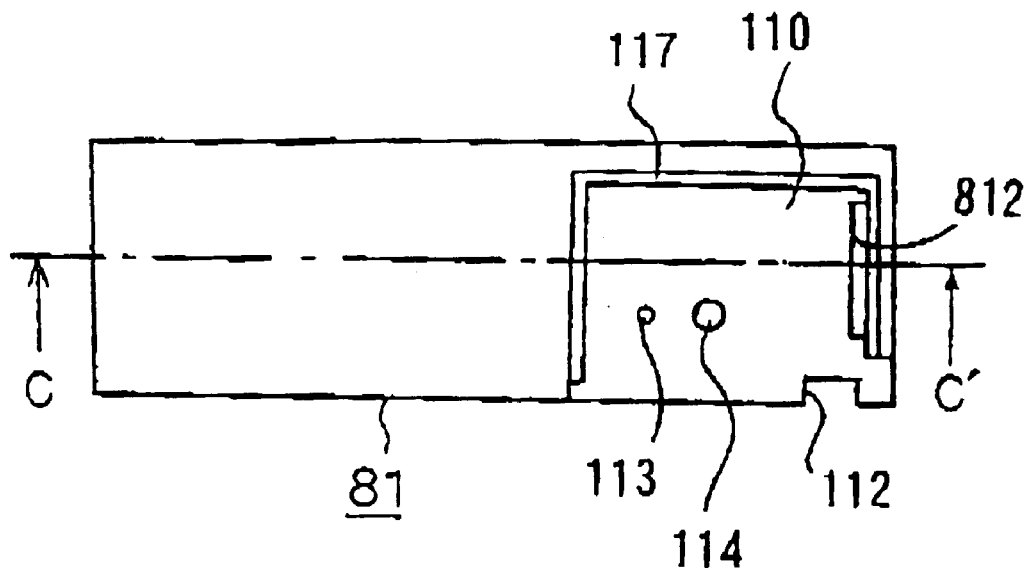
FIG. 8A is a top view of the inner cover 81.
Figure 8B:
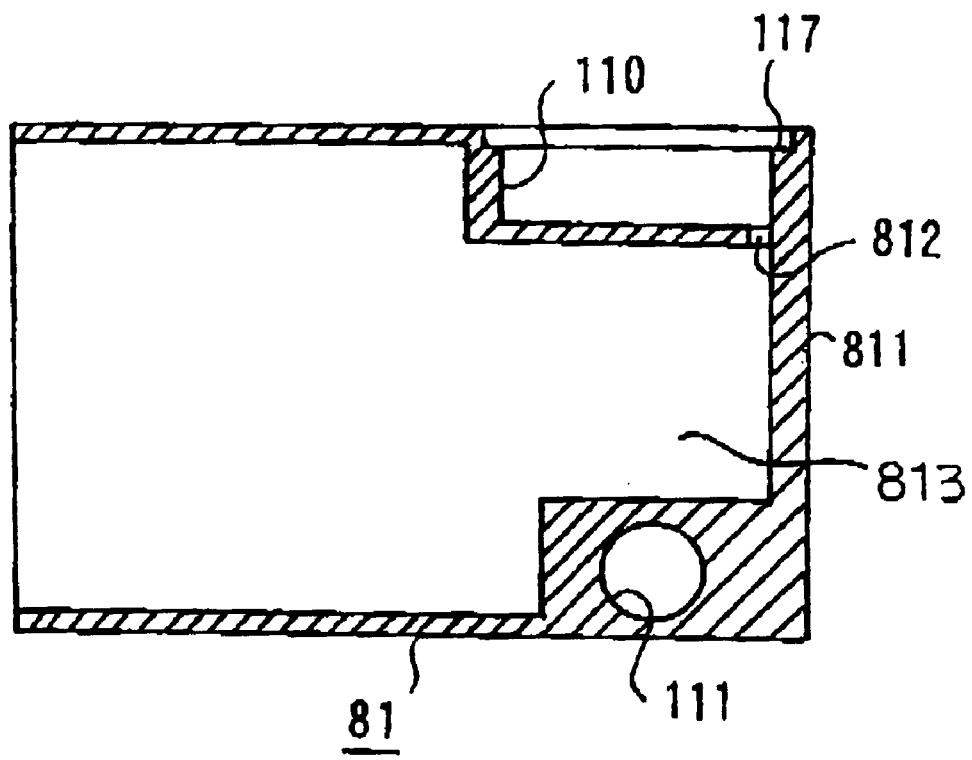
FIG. 8B is a cross section along C–C' line in FIG. 8A.
Figure 9:
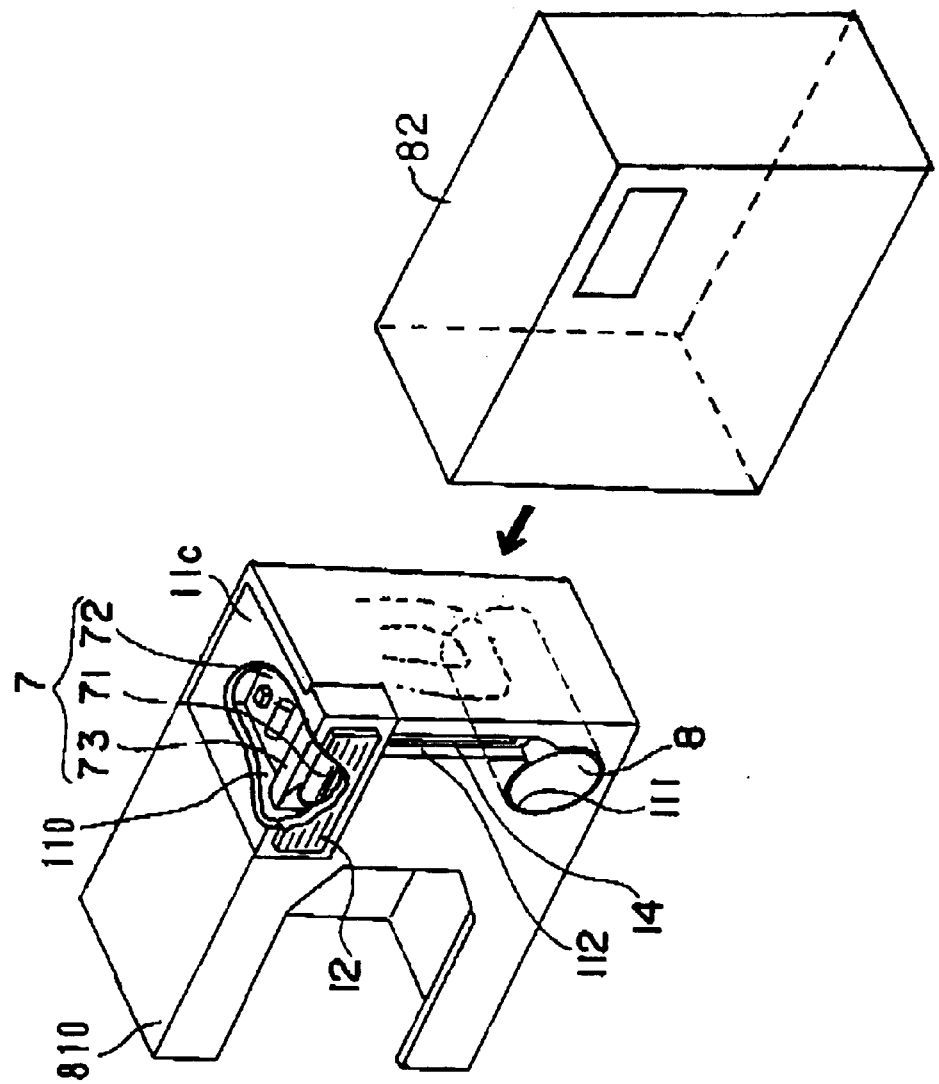
FIG. 9 illustrates the inner cover 81 and the outer cover 82.

FIGS. 8A and 8B illustrate the inner cover 81, with FIG. 8A illustrating the inner cover 81 viewed from above and FIG. 8B presenting a cross section along C–C' line in FIG. 8A. At the bottom surface of the housing portion 110, a notched portion 812, which communicates between the housing portion 110 and a carton-shaped inner space 813 of the inner cover 81 is formed, and the FPC 10 (see FIG. 7) of the strobe unit 7 is connected to the strobe control unit inside the camera main body unit 2 (see FIG. 10, which is to be detailed later) through the notched portion 812. It is to be noted that after the FPC 10 is passed through, the notched portion 812 is filled with a filler material. After the strobe unit 7 and the capacitor 8 are mounted at the inner cover 81 and the inner cover 11c is secured, an outer cover 82 formed in a carton shape having a bottom is externally fitted, as illustrated in FIG. 9, to achieve a completed slide cover. In other words, the inner cover 81 is inserted into the outer cover 82.

Figure 10A:
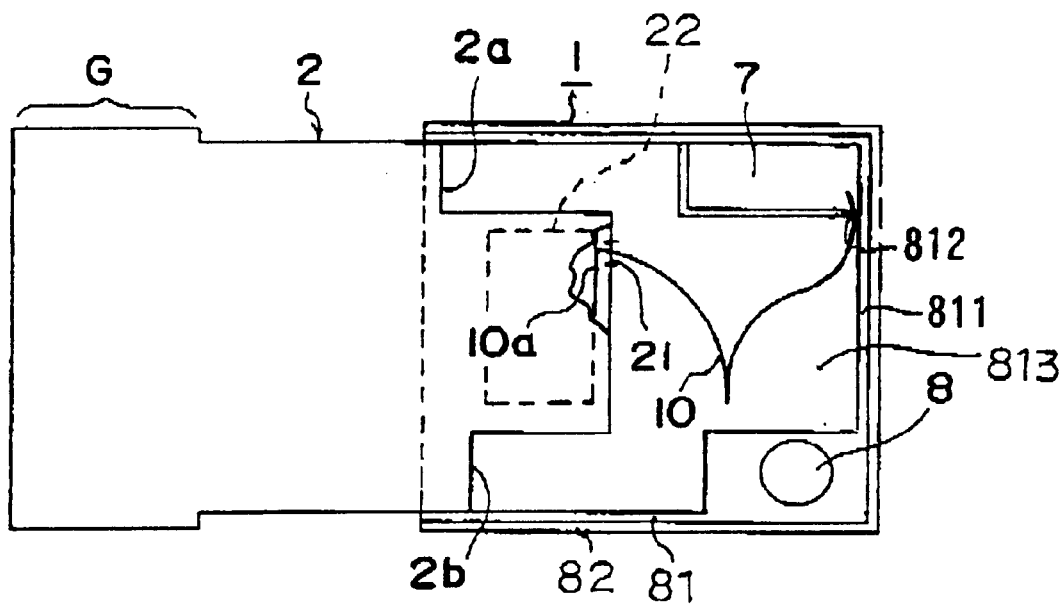
FIG. 10A illustrates the relationship between the slide cover 1 and the camera main body unit 2 achieved when the slide cover 1 is open.
Figure 10B:
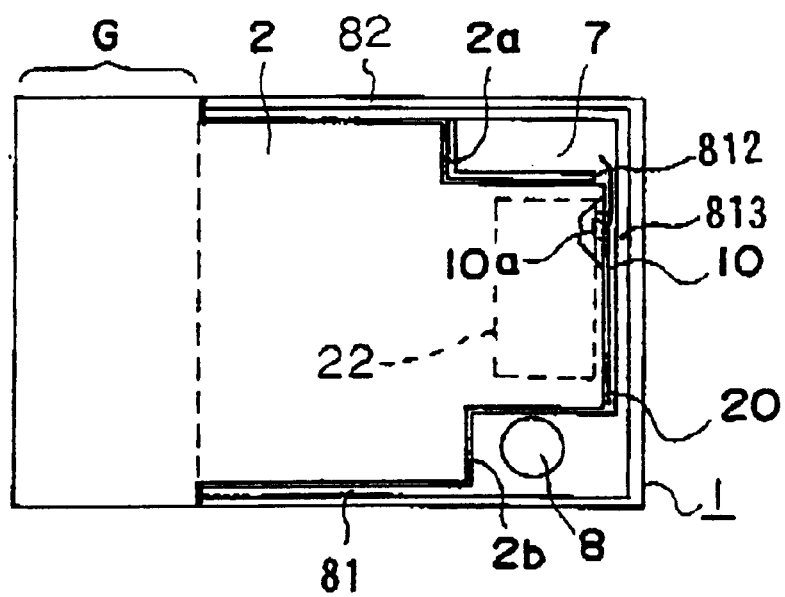
FIG. 10B illustrates the relationship between the slide cover 1 and the camera main body unit 2 achieved when the slide cover 1 is closed.

FIGS. 10A and 10B illustrate the relationship between the slide cover 1 and the camera main body unit 2, with FIG. 10A illustrating a state in which the slide cover 1 is open and FIG. 10B illustrating a state in which the slide cover 1 is closed. In both FIGS. 10A and 10B, the slide cover 1 is shown in a cross section to clearly illustrate the inside of the slide cover 1. The FPC 10, which is led out to the carton-shaped inner space 813 through the notched portion 812 of the inner cover 81, is then led into the camera main body unit 2 through the notched portion 21 formed at the end surface 20 of the camera main body unit 2 and is connected to a strobe control unit 22 housed inside the camera main body unit 2 via the connecting portion 10a. It is to be noted that a filler material is used to fill the gap between the notched portion 21 and the FPC 10 to maintain the inside of the camera main body unit 2 in a sealed state.

When the slide cover 1 is closed as illustrated in FIG. 10B, the strobe unit 7 and the capacitor 8 are positioned at the clearances (spaces) 2a and 2b formed at the top and the bottom of the projecting portion of the camera main body unit 2. In addition, the FPC 10 is housed in the gap formed between the end surface 20 of the camera main body unit 2 and a side surface 811 of the inner cover 81 in this state.

The camera in this embodiment, too, achieves advantages similar to those achieved by the camera in the first embodiment explained earlier. In addition, since it is not necessary to form a notched portion or the like for passing the FPC 10 through at the side surface 811 (which forms the bottom of the inner cover 81 formed in a carton shape with a bottom) of the inner cover 81 in the camera in this embodiment, as is required in the first embodiment, the strength of the inner cover 81 improves.

Third Embodiment

Figure 11:
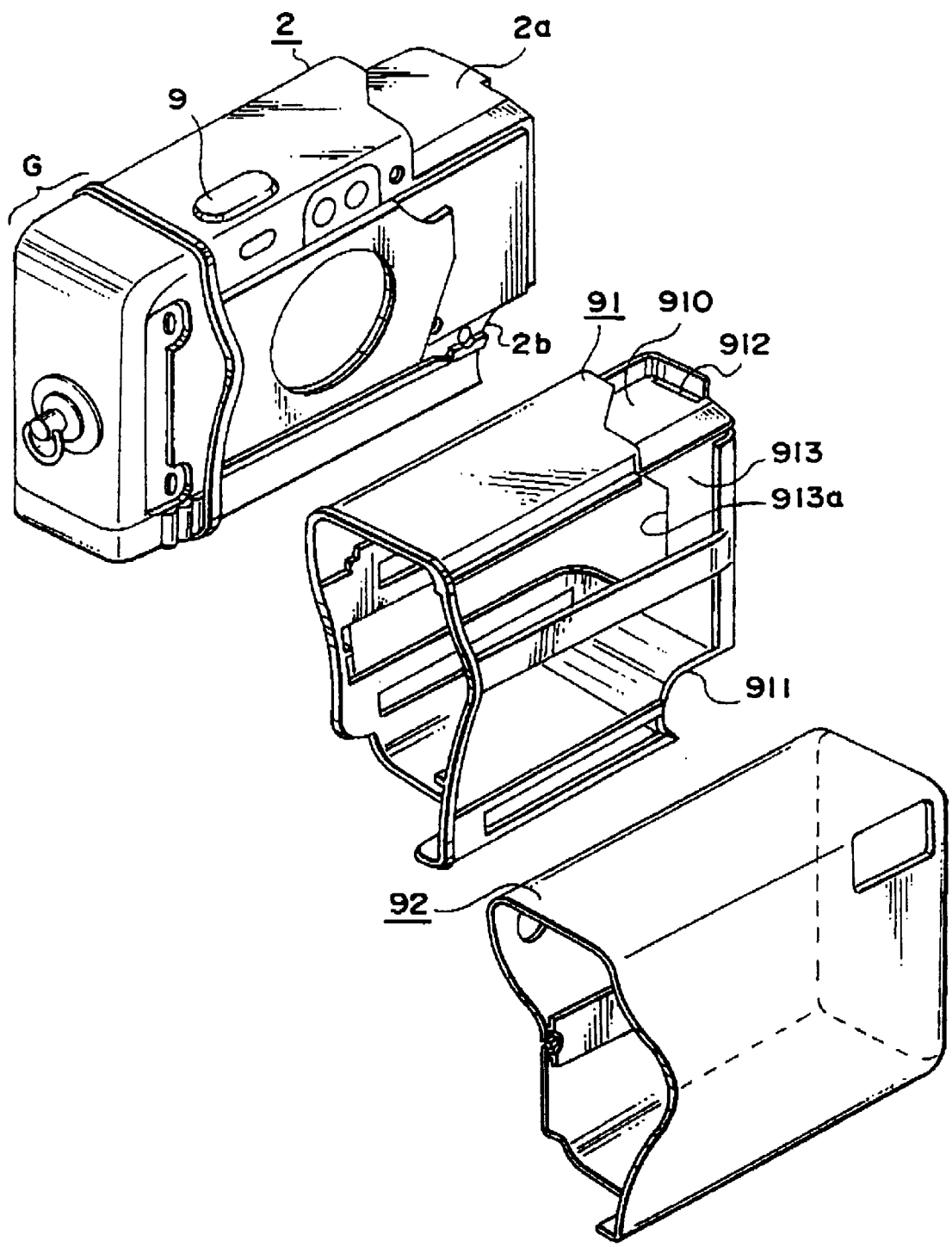
FIG. 11 illustrates the camera in a third embodiment.

FIG. 11 illustrates the third embodiment of the camera according to the present invention, with the same reference numbers assigned to components identical to those in the first and second embodiments described above. An inner cover 91 and an outer cover 92 are each formed in a carton shape with a bottom, and by externally fitting the outer cover 92 at the inner cover 91, an integrated slide cover is formed. Reference number 910 indicates a housing portion in which the strobe unit 7 (not shown) is housed and reference number 911 indicates an indented portion for housing the capacitor. At the bottom surface of the housing portion 910, a notched portion 912 for the FPC 10 is formed, as in the second embodiment. While the side surface 811 of the inner cover 81 is provided over the entire bottom surface of the inner cover 81 in the second embodiment, it does not need to be provided over the entire surface as long as a sufficient strength is assured, and there may be a narrow portion 913a as in a side surface 913 in FIG. 11.

It is to be noted that while the strobe unit 7 and the strobe capacitor 8 are provided at the slide cover 1 in the embodiments explained above, an AF element, an AE element, a shutter release switch and the like may be provided at the slide cover.

While the slide cover 1 assumes a sheath shape or a capsule shape in the embodiments described above, the shape of the slide cover does not need to be limited to such a shape. For instance, the slide cover may cover only the area that needs to be protected such as the area of the camera main body unit 2 where the photographing lens barrel 4, the viewfinder objective window 5 and the AF window 6 are provided in FIG. 1. More specifically, it may assume a shape achieved by cutting off approximately ⅓ of the slide cover 1 in FIG. 1 at the lower portion. In other words, the present invention may be adopted in all types of slide covers as long as they cover at least, the components of the camera that need to be protected when the camera is in a non-use state.

What is claimed is:

1. A camera comprising:
a camera main body having a lens barrel; and
a slide cover that moves relative to said camera main body between a camera non-use position at which the lens barrel, at least, is covered and a camera use position at which the lens barrel is exposed, wherein:
said slide cover has a sealed space which is formed and sealed by members constituting said slide cover; and
a camera component is provided in said sealed space.

2. A camera according to claim 1, wherein
said slide over is formed in a sheath shape to house said camera main body when said camera is in a non-use state.

3. A camera according to claim 1, wherein:
said space is sealed to achieve, at least, drip-proofing; and
the camera component is an electrical component.

4. A camera according to claim 1, wherein:
said members comprise an inner cover at which a housing space for housing the camera component is formed and an outer cover that covers an outer side of said inner cover; and
said housing space is sealed by covering the outer side of said inner cover with said outer cover.

5. A camera according to claim 4, wherein:
the camera component is an electronic flash device for illuminating a subject; and
said inner cover is constituted of an insulating material.

6. A camera according to claim 5, wherein:
said inner cover is formed in a sheath shape having a bottom to house said camera main body;
a communicating hole which communicates between an inner space of said sheath-shaped inner cover and said housing space where the electronic flash device for illuminating the subject is housed is provided at said inner cover; and
a wiring member that connects the electronic flash device inside said housing space to an electronic flash device control circuit inside said camera main body is let out to said inner space from said housing space via said communicating hole to be placed in a gap between said camera main body and a bottom portion of said inner cover.

7. A camera according to claim 1, wherein
said camera component is an electronic flash device for illuminating a subject.

8. A camera according to claim 1, wherein:
said camera component is an electrical component; and
an FPC that electrically connects between an electrical circuit provided in said camera main body and said electrical component provided in said sealed space is provided.

9. A camera according to claim 8, wherein
said FPC is housed in a space that is formed between an end surface of said camera main body located in a side of said slide cover and an inner surface of said slide cover when said slide cover is located at said camera non-use position.

10. A camera according to claim 1, wherein
said camera main body has a space that is formed to accommodate said sealed space when said slide cover is located at said camera non-use position.

11. A camera according to claim 1, wherein
said sealed space is formed at an upper corner in a side of said slide cover far from said camera main body.

12. A camera comprising:
a camera main body having a lens barrel; and
a slide cover that moves relative to said camera main body between a camera non-use position at which the lens barrel, at least, is covered and a camera use position at which the lens barrel is exposed, wherein:
said slide cover comprises an inner cover having at least two housing spaces for housing camera components and an outer cover that covers an outer side of said inner cover;

said two housing spaces are sealed and a linking space that links said two housing spaces with each other is formed between said inner cover and said outer cover, by covering the outer side of said inner cover with said outer cover; and a linking member that links the camera components housed in said two housing spaces with each other is provided in said linking space.

13. A camera according to claim 12, wherein:

a light emitting portion of an electronic flash device for illuminating a subject is housed in one of said two housing spaces;

an electronic component that is part of the electronic flash device for illuminating the subject is housed in other housing space; and an electrical connecting member that electrically connects the light emitting portion and the electrical component is provided in said linking space.

14. A camera comprising:

a camera main body having a lens barrel; and a slide cover that moves relative to said camera main body between a camera non-use position at which the lens barrel, at least, is covered and a camera use position at which the lens barrel is exposed, wherein:

said slide cover comprises an inner cover having a housing space for housing a camera component and an outer cover that covers an outer side of said inner cover;

said housing space is sealed and by covering the outer side of said inner cover with said outer cover; and a hole through which a linking member that links the camera component house din said housing space and another camera component outside said housing space is led out from said sealed housing space is formed at said inner cover.

15. A camera according to claim 14, wherein:

said camera component house din said housing space is a light emitting portion of an electronic flash device for illuminating a subject; and said other camera component is an electrical circuit portion of the electronic flash device for illuminating a subject provided at said camera main body.

16. A camera according to claim 14, wherein;

said hole is filled with a filler material to seal said housing space in a state in which said linking member is led out.

* * * * *